Aug. 26, 1958 R. P. ADAMS 2,849,611
ELECTRICAL OSCILLATOR CIRCUIT
Filed May 16, 1955
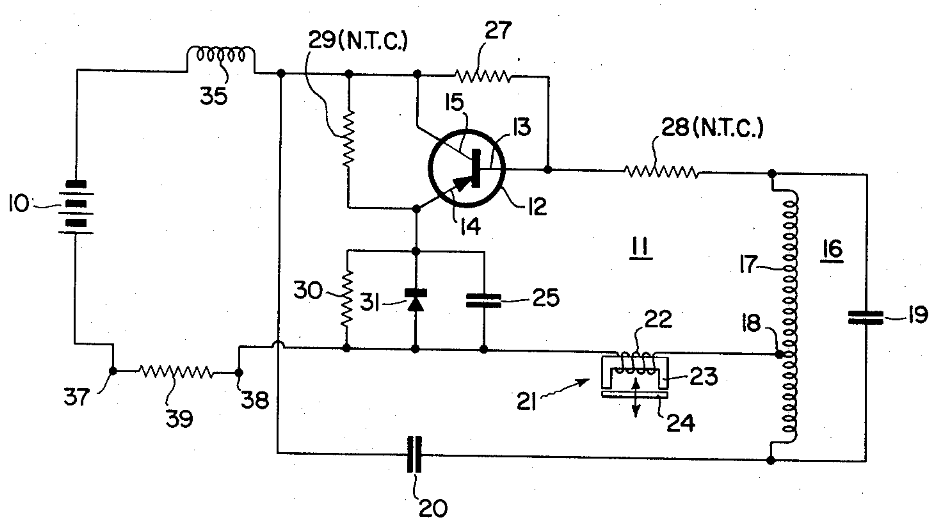
INVENTOR.
ROBERT P. ADAMS
BY Henry L. Hanson
ATTORNEY.

United States Patent Office 2,849,611
Patented Aug. 26, 1958

2,849,611

ELECTRICAL OSCILLATOR CIRCUIT

Robert P. Adams, Elkins Park, Pa., assignor to Minneapolis-Honeywell Regulator Company, Minneapolis, Minn., a corporation of Delaware Application May 16, 1955, Serial No. 508,706
8 Claims. (Cl. 250—36)

A general object of the present invention is to provide a new and improved transistor oscillator circuit which is particularly useful in an electrical transducer configuration wherein a first form of energy is transduced into a second form of energy. More specifically, the present invention is concerned with an improved transistor oscillator circuit which is characterized by its stability under widely varying ambient temperature conditions without any detrimental effect to the output characteristics of the circuit.

In transistor oscillator circuits which are used in conjunction with electrical transducers, it is desirable for the output of the circuit to vary proportionally with the input to the circuit. As the impedance and gain of known types of transistors change considerably with temperature, it is necessary to make suitable provision to insure the stability of the circuit and to maintain the circuit in an operative condition. It has been found that under low ambient temperature conditions that oscillator circuits of the present type are difficult to start oscillating due to an increase in the impedance of the transistors and due to a reduction of the gain of the transistors. When adequate compensation is made for low temperature operation by providing corrective bias signals, high temperature ambients may create unstable conditions unless the bias signals are readjusted.

It is accordingly a further object of the present invention to provide an improved transistor oscillator circuit which is characterized by its control bias source being adjustable in accordance with changes in ambient temperature so as to maintain the oscillator circuit operative over wide ranges of temperature change.

Inasmuch as the gain of a transistor and its internal impedances vary in accordance with the ambient temperature changes, it is necessary to provide special biasing and current flow paths for the transistor to improve its operating characteristics. This may be accomplished by connecting a resistor in shunt with the collector-base path of the transistor so as to produce a current flow path for current flowing in the emitter-base circuit and vary that current by means of an appropriate base resistor. The biasing resistor in the present application has been selected to be of the negative temperature coefficient type. The use of this type of a biasing resistor insures that under low ambient temperature conditions that a large bias signal will be available to initiate the transistor circuit into operative oscillatory condition. As the ambient temperature increases, the need for this additional bias decreases and consequently it is desirable that the effect of the biasing resistor be decreased.

It is, therefore, still another object of the present invention to provide a transistor oscillator circuit incorporating a shunt between two of the electrodes of the transistor circuit in cooperation with a negative temperature coefficient resistor to produce a transistor biasing voltage to improve the starting characteristics of the circuit without affecting appreciably its operation under high temperature conditions.

A further object of the present invention is to provide a shunt resistance circuit between the collector and base of a transistor circuit and a cooperative temperature sensitive resistor which is useful to produce a biasing voltage which varies with temperature to bias the base and emitter electrodes.

A still further object of the invention is to provide a temperature stable oscillator circuit using a transistor having two negative temperature coefficient resistors connected effectively in shunt circuits between the circuit electrodes of the transistor.

The various features of novelty which characterize the invention are pointed out with particularity in the claims annexed hereto and forming a part of the specification. For a better understanding of the invention, its advantages, and specific objects attained with its use, reference should be had to the accompanying drawings and descriptive matter in which there is illustrated and described preferred embodiments of the invention.

Referring to the single figure, the numeral 10 represents a direct current power source in the form of a battery. This power source is arranged to supply the operating power for a transistor oscillator circuit 11. This transistor oscillator circuit 11 comprises a transistor 12 having a base electrode 13, an emitter electrode 14, and a collector electrode 15.

The alternating current portion of the oscillator circuit 11 comprises, in addition to the transistor 12, a resonant circuit 16 which includes a tapped inductance element 17, tapped at 18 and a condenser 19. A feedback coupling condenser 20 serves to couple the output of the transistor 12 back to the resonant circuit 16. For adjusting the level of the circuit oscillation, there is provided a variable impedance 21 in the form of a coil 22 mounted upon a core 23. The air gap of the core 23 is arranged to be variably changed by a movable core member 24. A bypass condenser 25 is connected in the emitter circuit of the transistor 12.

The direct current biasing elements of the present circuit include a resistor 27 which is connected in shunt between the collector 15 and base 13. In series with the resistor 27 is a negative temperature coefficient resistor 28. Connected in shunt between the collector 15 and the emitter 14 is a further negative temperature coefficient resistor 29. Connected to the emitter electrode 14 is a resistor 30 and a diode 31, the latter being connected in parallel with the resistor 30.

The power supply to the transistor oscillator circuit 11 includes, in addition to the battery 10, a choke coil 35, and a pair of output terminals 37 and 38, the latter of which are arranged to have a suitable indicator and/or controller connected thereto with the input of such an output device having an impedance as represented by the resistor 39. It will be readily apparent that the apparatus may be used in any indicating or control function in the manner well known in the art.

In considering the operation of the present apparatus, it should first be noted that the apparatus is intended to produce an output current flowing in the output load impedance which varies proportionally with the position of the core member 24 with respect to the core 23. Thus, as the core 24 is moved closer to the core 23, it is intended that the output current flowing through the load impedance 39 decrease while if the core 24 is moved away from the core 23, it is intended that the current through the load impedance 39 increase.

The direct current supply circuit for the transistor 12 may be traced from the lower terminal of the battery 10 through load impedance 39, resistor 30 and diode 31, connected in parallel, emitter 14, collector 15, choke coil 35 back to the upper terminal of the battery 10. The average direct current flowing in this last traced circuit will be directly dependent upon the intensity of the oscillations of the transistor oscillator circuit 11.

The output alternating current circuit of the transistor 12 may be traced from the collector 15 through condenser 20, the lower portion of the inductance element 17 to tap 18, variable impedance 21 and condenser 25 back to the emitter 14 of the transistor 12. The regenerative feedback for the circuit is produced by the signal induced in the upper portion of the inductance element 17 and is coupled from the upper terminal of the inductance element 17 through resistor 28 to the base electrode 13. The amount of feedback in the upper portion of the inductance element 17 is dependent directly upon the magnitude of the impedance 21 and the amount of signal induced in the lower portion of the inductance element 17. As the magnitude of the impedance 21 goes down due to the movement of the core 24 away from the core 23, the intensity of the oscillations will increase due to a larger signal being fed back to the base electrode 13.

As the input impedance of transistor 12 increases with decreases in ambient temperature, it is essential that some means be provided that the input impedance and the gain not change to a value which will prevent the circuit from going into oscillation. This has been provided by the presence of the resistors 27 and 28.

As the internal impedances of the transistor increase with decreases in ambient temperature, there is a resultant decrease in the current flow through the transistor between the electrodes thereof. Thus, under low ambient temperature conditions, the current flow between the emitter 14 and base 12 decreases to the point that the circuit is difficult to excite into a state of oscillation. The current flow in the emitter-base circuit may be increased by placing the resistor 27 between the base 13 and the negative terminal of the source 10. As the resistors 27 and 28 form a voltage divider across the source 10, the actual current flow will be a function of the relative magnitudes of the resistors 27 and 28 as well as the emitter-base impedance. Maximum emitter-base bias current will flow when resistor 28 is infinite in magnitude. Minimum emitter-base bias current will flow when resistor 28 is of zero magnitude. As there must be a certain magnitude of current flowing in the emitter-base circuit to initiate oscillations, and since the impedance of the transistor emitter-base circuit varies with temperature, it is necessary to vary the voltage on the base relative to the emitter 14 as the ambient temperature changes. As the temperature goes up, the resistance of the resistor 28 will go down so that the amount of bias on the emitter-base circuit will be decreased. This arrangement is desirable in that under high temperature conditions substantially no bias is required between the base 13 and emitter 14 to effect the desired current flow for oscillation initiation purposes.

Further temperature stabilization in the present circuit is achieved by the presence of the negative temperature coefficient resistor 29 which is connected between the collector 15 and the emitter 14. This is particularly effective in the high ambient regions where the resistor 29 cooperates with resistor 30 and diode 31 to readjust the bias on the transistor 12 into a stable operating region.

Further temperature stabilization is achieved in the present oscillator circuit by the resistor 30 and the diode 31. Under low current conditions, the impedance of the diode 31 is relatively high so that the net impedance of the diode in combination with the resistor 30 approaches that of the resistor 30. As the current in the circuit goes up, the impedance of the diode 31 goes down. By having a high impedance under low current conditions, it is possible to better limit the amount of leakage current that will be flowing in the emitter and collector path. Under high current conditions, it is desirable that this biasing circuit not limit the maximum current which will flow in the circuit and this is achieved by the diode 31 which appears as a relatively low resistance under high current conditions.

The biasing circuit elements which were found to work satisfactorily in one form of the apparatus in combination with a Honeywell H-2 transistor are as follows:

| | |
|---|---|
| Resistor **27** | 82 K. ohms. |
| Resistor **28** | 100 ohms at 25° C. |
| Resistor **29** | 180 K. at 25° C. |
| Resistor **30** | 180 ohms. |
| Diode **31** | Type 1N91. |

It will be noted that in considering the above values that resistors 27 and 28 are selected to be of such a magnitude that while resistor 28 may change over a wide range of values with ambient temperature change that the current flowing in the circuit formed by the resistors 28 and 27 connected in series will remain substantially unchanged since resistor 27 is large compared to the size of the resistor 28. This will mean that there will be a negligible change in the output direct current flowing through the load impedance 39.

From the foregoing it will be readily apparent that there has been disclosed a new and improved transistor oscillator circuit with improved temperature stable characteristics. Further, these stabilized characteristics have been incorporated in a transducer which is adapted to produce a proportional output current flow change which varies in accordance with an impedance change on the input of the oscillator circuit.

While, in accordance with the provisions of the statutes, there has been illustrated and described the best forms of the embodiments of the invention known, it will be apparent to those skilled in the art that changes may be made in the forms of the apparatus disclosed without departing from the spirit of the invention as set forth in the appended claims and that in some cases, certain features of the invention may be used to advantage without a corresponding use of other features.

Having now described the invention, what is claimed as new and for which it is desired to secure by Letters Patent is:

1. A transistor oscillator comprising a three electrode transistor device having an input circuit and an output circuit, a regenerative feedback circuit connected between said output circuit and said input circuit, a direct current bypass circuit connected to directly shunt two of said electrodes, and a biasing resistor having an appreciable temperature coefficient connected in series with one of said two electrodes and said bypass circuit, said bypass circuit and said biasing resistor comprising a temperature responsive signal divider network to provide a controlled bias to condition said transistor for oscillation under varying changes in ambient temperature.

2. A transistor oscillator circuit comprising a transistor device having emitter, collector, and base electrodes, an input circuit including said emitter and base electrodes, an output circuit including said emitter and collector electrodes, a regenerative feedback connection between said output and input circuits, and an oscillator starting circuit comprising a first resistor connected directly in shunt with the base-collector path of said transistor device and a second resistor in series with said base electrode, said second resistor comprising a resistor having an appreciable temperature coefficient, said first and second resistors constituting a temperature responsive signal divider transistor biasing network.

3. A transistor oscillator circuit comprising a transistor device having emitter, collector, and base electrodes, an input circuit including said emitter and base electrodes, an output circuit including said emitter and collector electrodes, a direct current source, means connecting said source in series with said output circuit, a regenerative feedback connection between said output and input circuits, first and second resistors, means connecting said first and second resistors in a first series circuit with said source, and an oscillator starting circuit comprising said first resistor connected directly in shunt with the base-collector path of said transistor device and said second resistor connected in a series circuit between said base electrode and said emitter electrode, said second resistor having an appreciable temperature coefficient of resistance, said first and second resistors constituting a temperature responsive signal divider transistor biasing network.

4. Apparatus as defined in claim 3 wherein the size of the resistance of said first resistor when compared to said second resistor is such that changes in magnitude of said second resistor will produce a negligible change in the resistance of said first series circuit.

5. Apparatus as defined in claim 3 wherein a third resistor having an appreciable temperature coefficient of resistance is connected between said collector electrode and said emitter electrode.

6. A transistor oscillator circuit comprising a transistor device having emitter, collector, and base electrodes, an input circuit including said emitter and base electrodes, an output circuit including said emitter and collector electrodes, a regenerative feedback connection between said output and input circuits, and an oscillator starting circuit comprising a first resistor connected directly in shunt with the base-collector path of said transistor device and a second resistor in series with said base electrode, said second resistor having a negative temperature coefficient, said first and second resistors comprising a temperature responsive signal divider network for biasing said transistor.

7. An oscillator circuit as defined in claim 6 wherein a third resistor, also of the negative temperature coefficient type, is connected between said collector and emitter electrodes.

8. A temperature stabilized transistor oscillator comprising a transistor having an input circuit and an output circuit, a regenerative connection between said output circuit and said input circuit to maintain said oscillator in an oscillating state, and a pair of temperature responsive signal divider transistor biasing networks each including a negative temperature coefficient resistor connected to said transistor, one in said regenerative circuit and the other in shunt with said output.

References Cited in the file of this patent

UNITED STATES PATENTS

| | | |
|---|---|---|
| 2,533,001 | Eberhard | Dec. 5, 1950 |
| 2,579,336 | Rack | Dec. 18, 1951 |
| 2,647,958 | Barney | Aug. 4, 1953 |
| 2,681,996 | Wallace | June 22, 1954 |
| 2,757,243 | Thomas | July 31, 1956 |
| 2,791,693 | Moore | May 7, 1957 |